United States Patent [19]

Lorett

[11] Patent Number: 4,621,981
[45] Date of Patent: Nov. 11, 1986

[54] PUMP IMPROVEMENT

[75] Inventor: Jorge A. Lorett, Beaumaris, Australia

[73] Assignee: Borg-Warner Corporation, Chicago, Ill.

[21] Appl. No.: 730,127

[22] Filed: May 3, 1985

Related U.S. Application Data

[63] Continuation of Ser. No. 438,550, Nov. 1, 1982, abandoned.

[51] Int. Cl.$^4$ .................. F04D 7/06; F04D 29/12
[52] U.S. Cl. .................. 417/83; 417/423 R; 415/170 A; 415/112; 210/787
[58] Field of Search .......... 417/83, 89, 423 R, 424; 210/787; 415/131, 132, 175, 176, 170 A, 112

[56] References Cited

U.S. PATENT DOCUMENTS

| | | | |
|---|---|---|---|
| 879,484 | 2/1908 | Murternd | 415/176 X |
| 913,407 | 2/1909 | Ljungstrom | 415/179 X |
| 2,124,681 | 7/1938 | Jauch et al. | 417/83 |
| 2,441,708 | 5/1948 | Luaces et al. | 415/175 X |
| 2,654,479 | 10/1953 | Driessen | 210/787 X |
| 2,850,550 | 11/1974 | Kaessen | 417/372 |
| 2,933,044 | 4/1960 | Williams | 417/407 X |
| 3,457,870 | 7/1969 | Sleeter | 415/173 R |
| 3,574,478 | 4/1971 | Toth, Jr. et al. | 415/112 |
| 3,790,312 | 2/1974 | Bottoms | 417/424 |
| 3,976,391 | 8/1976 | Randell | 415/175 X |
| 4,352,637 | 10/1982 | Weisenbach | 417/87 X |

FOREIGN PATENT DOCUMENTS

| | | | |
|---|---|---|---|
| 433504 | 9/1926 | Fed. Rep. of Germany | 59b/ |
| 2435846 | 7/1974 | Fed. Rep. of Germany | |
| 992225 | 5/1965 | United Kingdom | 415/175 |
| 637555 | 12/1978 | U.S.S.R. | 417/89 |

Primary Examiner—William L. Freeh
Assistant Examiner—Theodore W. Olds
Attorney, Agent, or Firm—John W. Harbst

[57] ABSTRACT

A pump assembly having an impeller for pumping a liquid from an inlet to an outlet, said impeller being driven by a motor, and mechanical seal means comprising a pump seal and a motor seal with a seal leakage chamber therebetween, and ejector means for inducing flow of liquid from the seal chamber so that it does not leak across the faces of the seal rings of the motor seal and into the motor housing where it would damage the motor. The ejector means has a nozzle driven by pump liquid and a suction chamber connected to the mechanical seal leakage chamber. By preventing liquid from the seal chamber from leaking across the faces of the motor seal into the motor housing, the ejector means maintains the seal leakage chamber at or near the vapor pressure of the pumped fluid.

4 Claims, 10 Drawing Figures

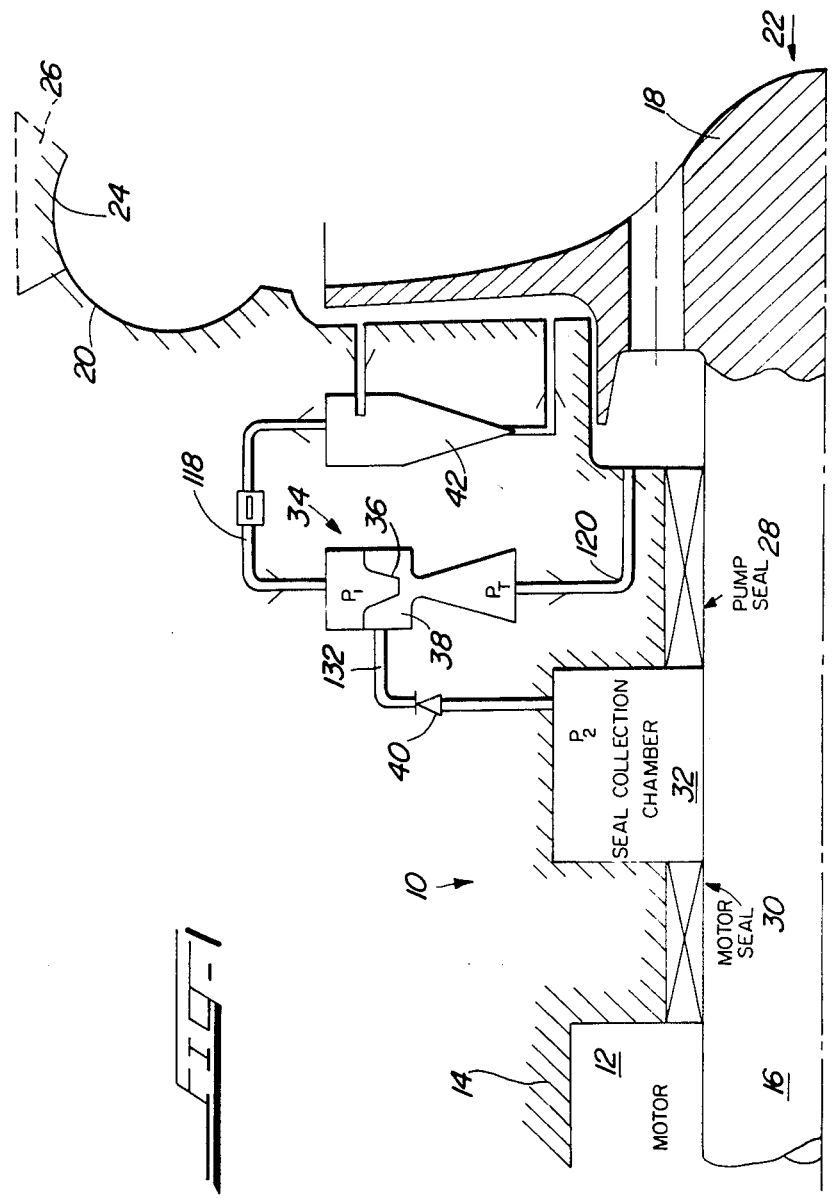

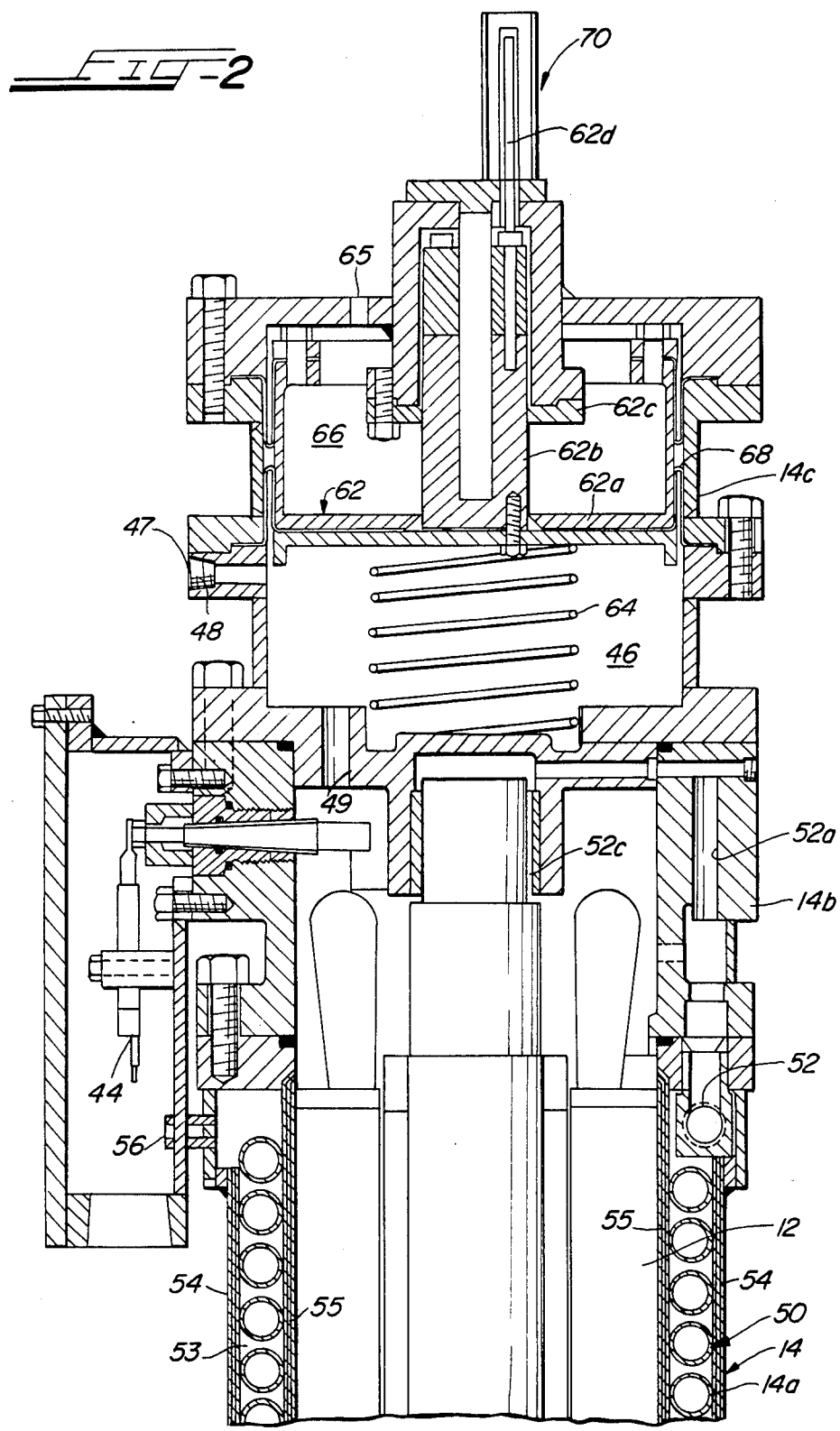

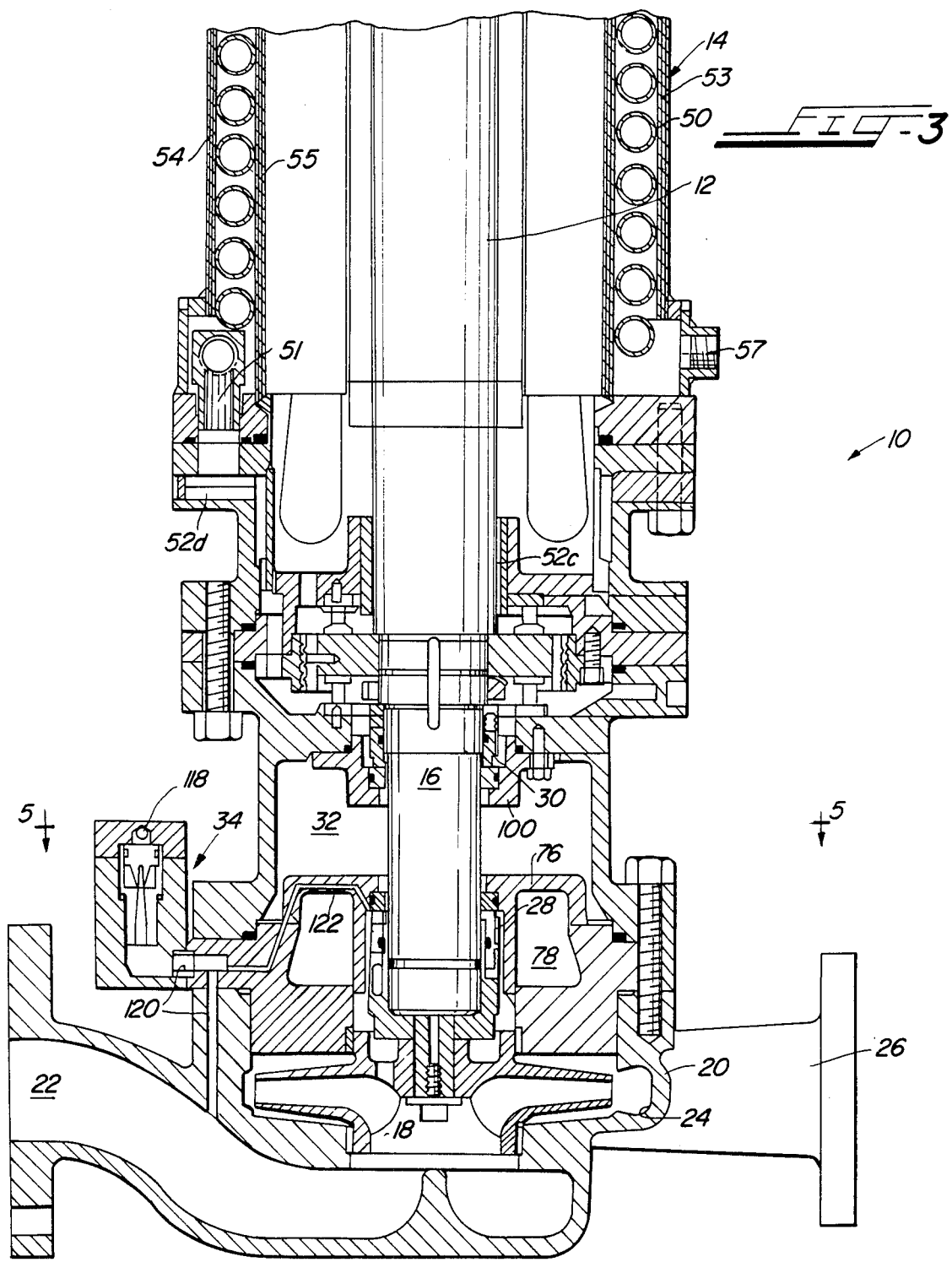

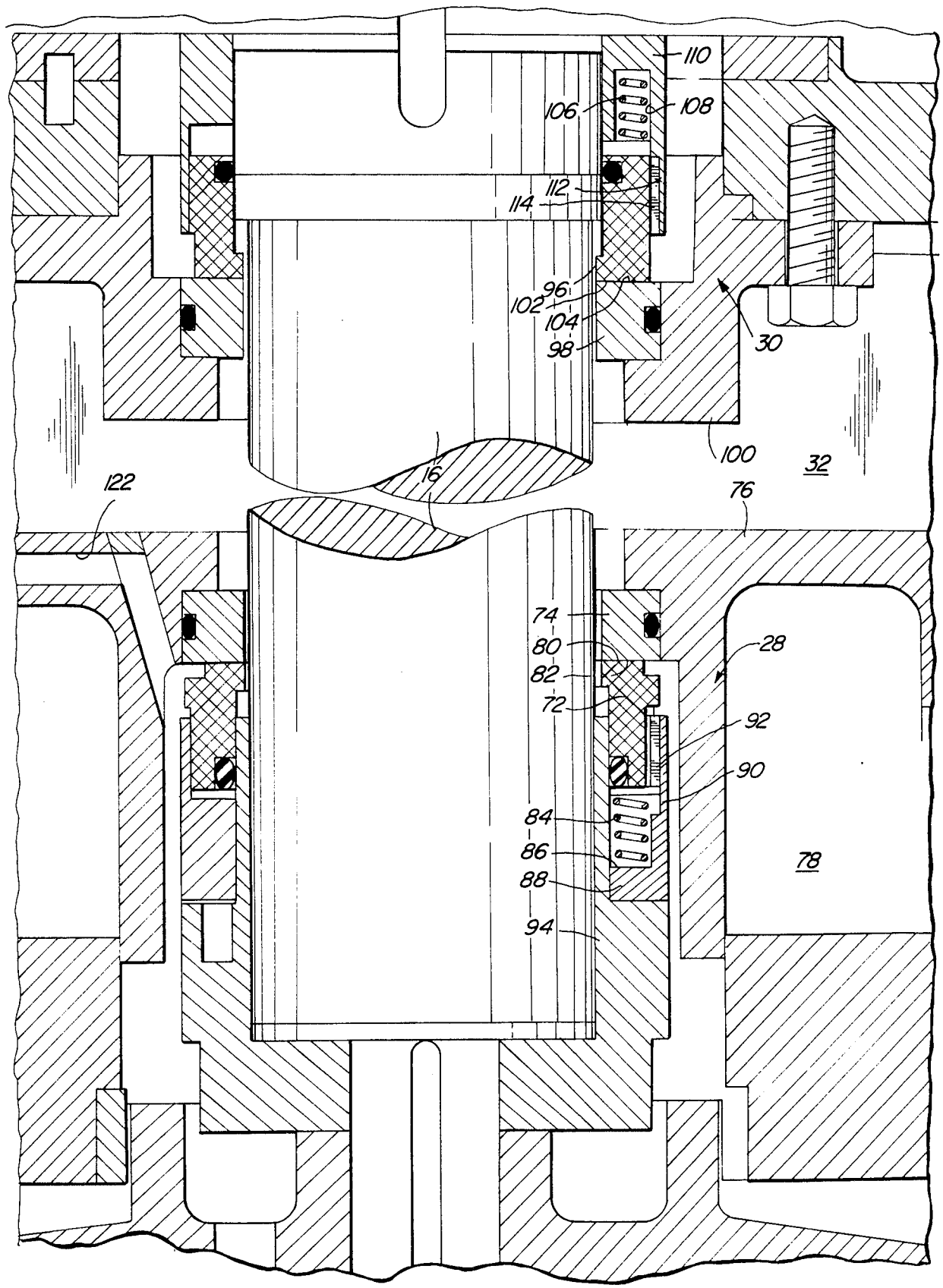

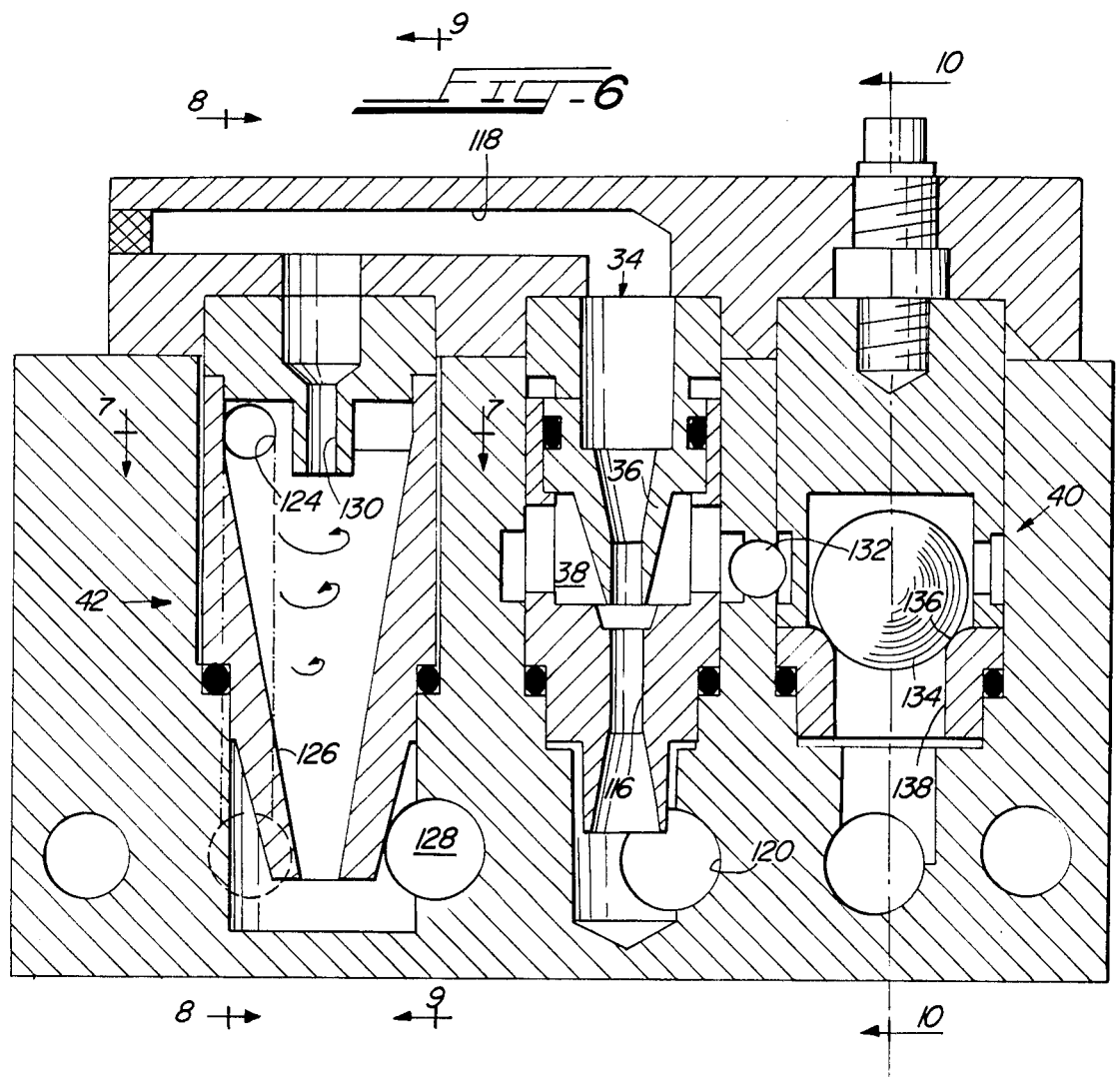
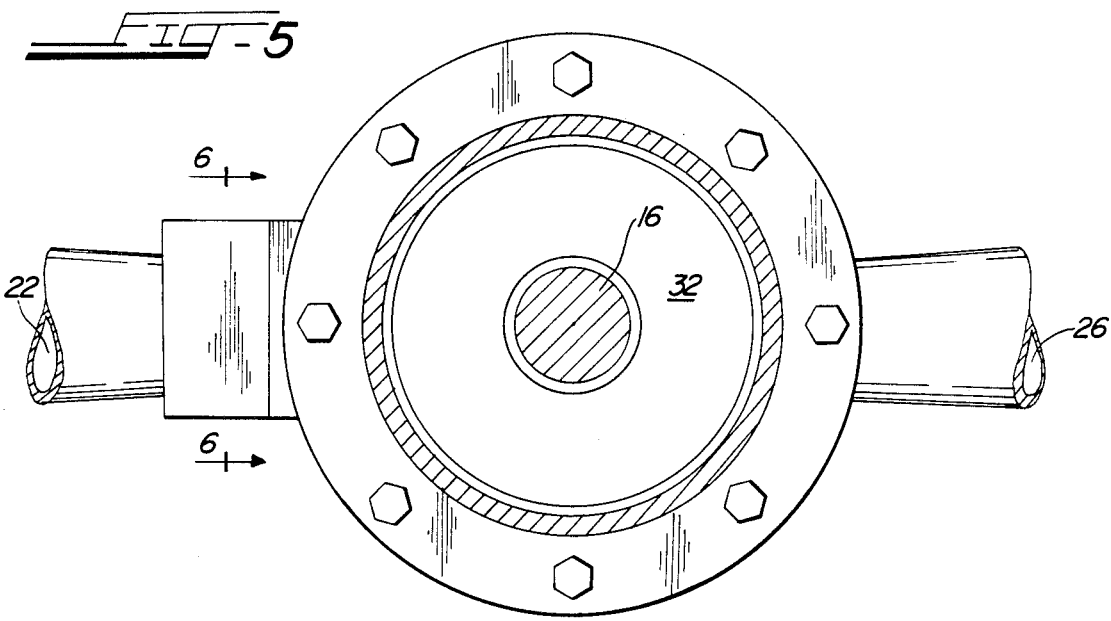

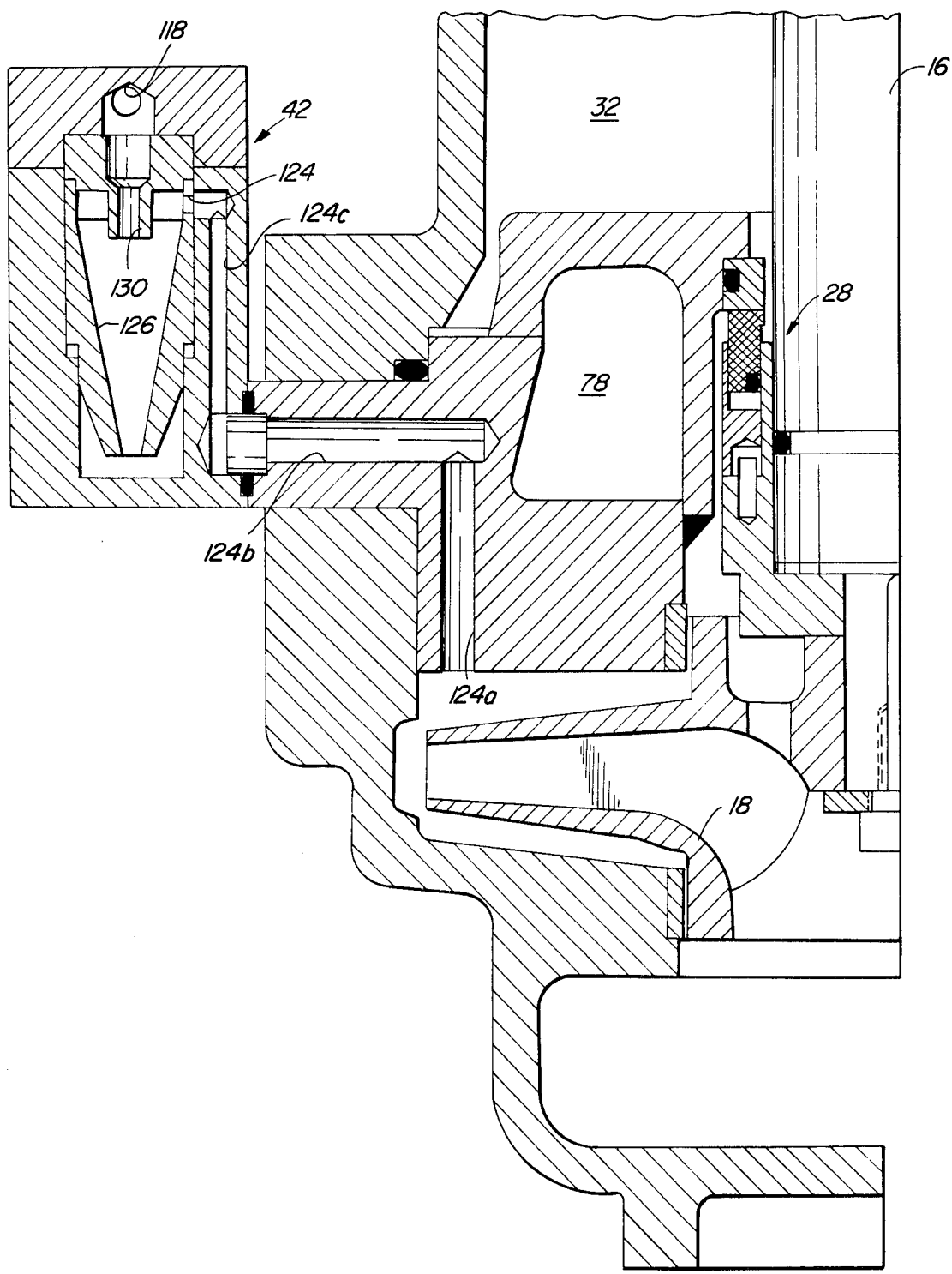

PUMP IMPROVEMENT

This is a continuation, of application Ser. No. 438,550 filed Nov. 1, 1982 now abandoned.

BACKGROUND OF THE INVENTION

This invention relates to canned motor pumps which are used in applications where the pumped liquid must not escape to the surroundings, for example, in those pumps used to pump nuclear waste and non-biogradable, aromatic or toxic fluids. Enclosing or encasing the motor is a solution to prevent the escape of pumped liquid, but this procedure does not solve the problem of preventing the pumped liquid from attacking the motor. The encased units are also inefficient and expensive and require special measures to provide adequate motor cooling, electrical connections, and the like.

Other approaches to the problem are shown, for example, in the U.S. Pat. Nos. 3,850,550; 3,790,312 and 3,574,478. U.S. Pat. No. 3,850,550 teaches an arrangement which includes a pair of seals in seal chambers and deliberately supplies pumped liquid to flush out the pump seal chambers which liquid flows back to the pump suction. The motor seal chamber is filled with a lubricant.

U.S. Pat. No. 3,790,312 teaches structure to prevent fuel, pumped liquid, or fuel vapor from flowing to the pump bearings or to a labyrinth seal chamber. A secondary impeller is used to pump the liquid or vapor from the bearings or chamber.

U.S. Pat. No. 3,574,478 teaches evacuating a bearing chamber in a turbine arrangement to draw a stream of air past a labyrinthine packing toward the bearing chamber. A stream of air is drawn from the same source past a second labyrinthine packing by taking advantage of the vacuum producing effect of the flow air.

These approaches do not entirely solve the problem of pumping nuclear waste and non-biogradable, aromatic or toxic fluids unless one can ensure that the pumped liquid will not migrate through the motor seal to the motor.

SUMMARY OF THE INVENTION

The primary object of the invention to be described is to ensure that any leakage of the pumped liquid past the pump seal in a multiple mechanical seal arrangement is immediately returned to the pump suction without the use of any external mechanism. To accomplish this primary object, it is proposed to use an ejector functioning as a liquid pump and to ensure that the ejector nozzle does not clog because of solids in the liquid. When necessary, a separator is used to prevent solids entrained in the liquid from entering the ejector. A one-way check valve is provided to prevent the reverse flow of liquid when the pump is not operating.

The ejector is connected at one end to a seal leakage chamber which connects to the suction chamber of the ejector. The driving nozzle of the ejector is connected to the pump discharge, so that flow of pumped liquid therethrough produces a pressure drop which draws or induces pumped liquid to the suction chamber from the seal leakage collection chamber. The induced liquid and the driving liquid are then discharged into the pump's intake or suction. The ejector, separator and one-way valve are integrally installed in the pump housing or conveniently located in a block easily connected to the pump housing. All conduits for the liquid and solid flow are built into the housing or the block, as the case may be.

The ejector, because of the suction created, removes any pumped liquid from the motor seal chamber and also maintains the seal leakage or collection chamber at near the vapor pressure of the pumped liquid. Any liquid from the seal leakage chamber is thus prevented from passing to the seal faces of the motor seal.

The subject matter of this invention is especially adaptable for use in those pump assemblies in which the motor is immersed in a fluid and will be described in conjunction with a pump in which the motor is immersed in pressurized oil under controlled pressure.

BRIEF DESCRIPTION OF THE DRAWINGS

FIG. 1 is a schematic illustration of the preferred embodiment of this invention;

FIGS. 2 and 3, when placed with the former above the latter, show a longitudinal section view through a pump assembly incorporating the structure of the preferred embodiment of this invention;

FIG. 4 is a detailed, partial sectional view through the mechanical seals of the pump;

FIG. 5 is a sectional view taken on line 5—5 of FIG. 3;

FIG. 6 is a cross-sectional view taken on line 6—6 of FIG. 5;

FIGS. 8 and 9 are partial sectional views taken on lines 8—8 and 9-8, respectively of FIG. 6 and through the separator to show the flow path of liquid to suction.

DESCRIPTION OF THE PREFERRED EMBODIMENTS

Figure 9:
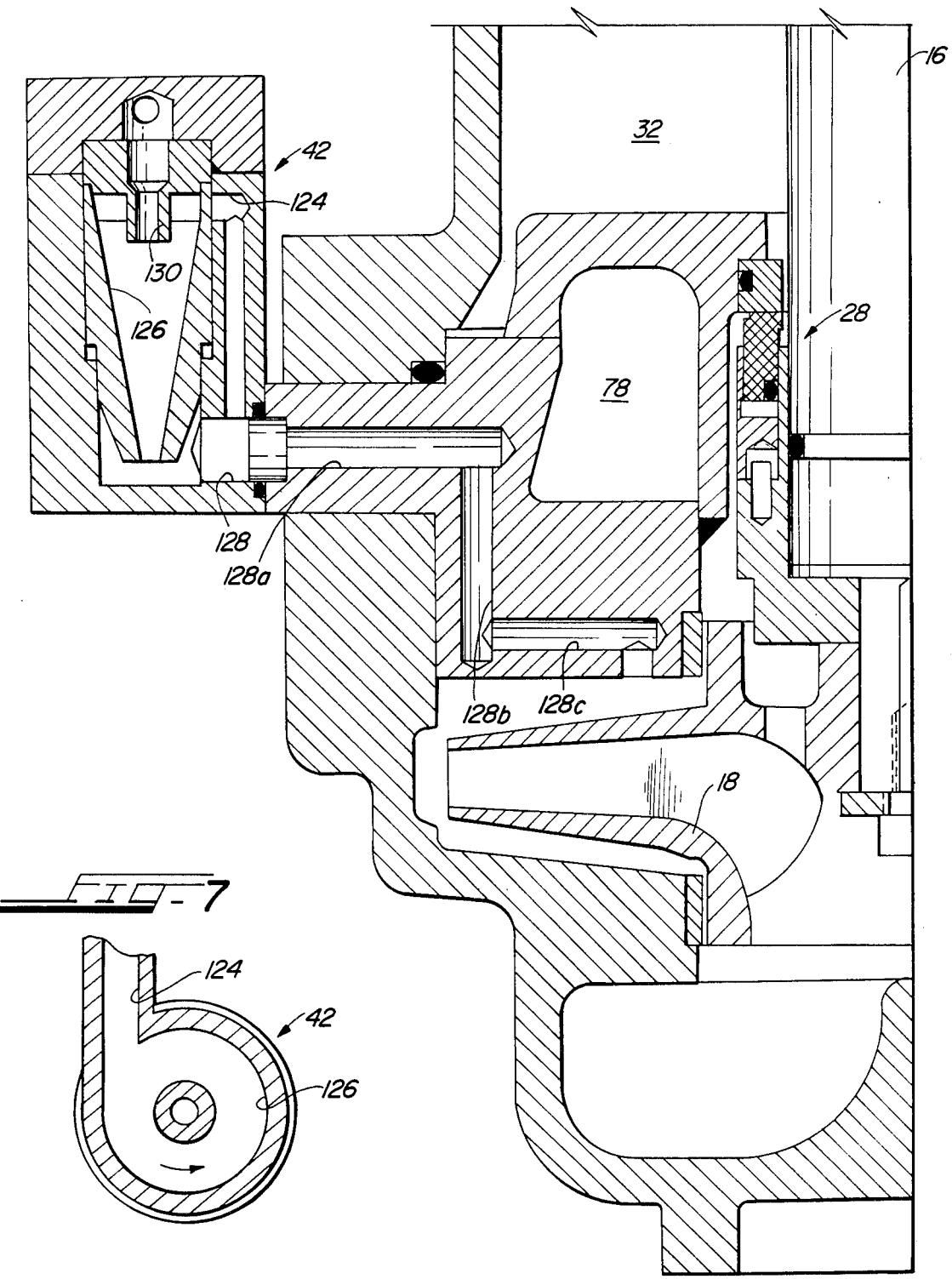

The essential parts and preferred arrangement of parts of this invention are illustrated schematically in FIG. 1. A more detailed description of parts will be later made with reference to the other figures of the drawings.

The pump assembly, generally identified as 10, comprises electric motor 12 in motor housing 14 and having a shaft 16 connected to pump impeller 18. Impeller 18 is located in pump casing 20 with a suction or inlet 22 (as indicated by the arrows). Pumped liquid is discharged into scroll 24 to outlet 26. A pair of mechanical seals 28 and 30 surround the shaft 16, seal 28 being referred to as the pump seal and seal 30 being referred to as the motor seal. Seals 28 and 30 are of usual construction and each comprises a pair of seal rings between which is located a seal leakage or collection chamber 32; the prevention of the migration of the pumped liquid across the faces of seal 30 into the motor housing is a principal object of this invention.

An ejector 34 comprising a jet or nozzle 36 and a suction chamber 38, is connected by suitable passages to the high pressure region of the pump, so that pumped liquid flows through nozzle 36. Because of the restriction of the nozzle, liquid flow from seal chamber 32 is drawn or induced to suction chamber 38. Ejector 34 discharges induced liquid from suction chamber 38 to the pump suction.

To prevent back flow of induced liquid to seal chamber 32, as when the pump is not operating, a one-way valve 40 is located in the passageway connecting the seal chamber and suction chamber 38.

A cyclone separator 42 is provided where necessary to remove solids from the liquid flowing to the ejector. The pumped liquid flows into the separator where it swirls, such that heavier solids fall to the bottom, where, with some liquid, they return to a lower pressure region of the pump.

In FIGS. 2 and 3, there is illustrated, in a structural assembly, pump 10, electric motor 12, motor housing 14, motor shaft 16, pump impeller 18, volute casing 20, inlet or suction 22, scroll 24, outlet or discharge 26, pump mechanical seal 28, motor mechanical seal 30, seal leakage or collection chamber 32 and ejector 34.

Electrical connections to the motor 12 are made to bus bars 44 and are conventional. Further description is deemed unnecessary.

Motor housing 14 is constructed of a series of parts including a cylindrical body portion 14a formed by outer wall 54 and inner wall 55, upper cover 14b and cap assembly 14c. Motor 12 is immersed in a lubricating cooling oil (not shown) introduced into reservoir 46 in cap assembly 14c through port 47 closed by plug 48. The interior of the motor housing communicates with the reservoir by passageway 49. After the unit is assembled, a predetermined quantity of lubricating cooling oil is supplied to fill the voids around motor 12 and at least a part of reservoir 46. The oil, hereinafter referred to as "motor fluid" is cooled by an externally supplied coolant flowing around helical coil 50 through which the motor fluid is introduced at lower inlet and discharged at 51 upper discharge outlet 52. Various passges 52a and 52b in upper casting 52c in motor shaft bearing, 52d in lower casting and 52e in lower motor shaft bearing, allow motor fluid to circulate in and around the motor assembly. Externally supplied coolant is supplied around coil 50 in space 53 defined by outer wall 54 of housing 14 and inner wall 55 surrounding motor 12. The coolant is supplied at fitting 56 and is discharged at fitting 57.

The motor fluid is pressurized by piston assembly 62 against a force exerted by coil spring 64. Compressed air or other pressurized medium, such as pump fluid is fed through a fitting 65 to chamber 66 on the opposite side of piston assembly 62 urging the piston assembly downwardly against the force of the spring 64. Piston assembly 62 includes annular cup-shaped element 62a and centrally located piston body 62b supported, and in slidable contact with, boss 62c attached to cap assembly 14c of housing 14. Flexible diaphragm 68 seals reservoir 46 from chamber 66. The position of piston 62a is indicative of the motor fluid level and motor fluid level indicator 70, which includes element 62d movable with piston assembly element 62a, is provided. Indicator 70 is preferably calibrated to permit a direct reading of the motor fluid level. It is to be understood that the subject of this invention is also usable with a pump assembly in which the motor is not immersed in a motor fluid.

FIG. 4 is an enlarged sectional view through mechanical seals 28 and 30 between which is located seal leakage or collection chamber 32 from which pumped fluid which migrates past pump seal 28 is removed. Pump seal 28 comprises rotatable seal ring 72 and stationary seal ring 74, ring 74 being supported by housing part 76 formed with a cooling chamber 78. Rings 72 and 74 have opposed seal faces 80 and 82, respectively. Ring 72 is supported for limited axial movement and is urged toward ring 74 by a plurality of coil springs 84 (only one of which is shown) received in pockets 86 in spring holder 88. Holder 88 has an axially extending cylindrical portion 90 which at least partly overlies ring 72. Ring 72 is keyed to cylindrical portion 90 by key 92 in opposed axial keyways in ring 72 and portion 90. Ring 72 and holder 88 are supported by shaft sleeve 94 keyed to shaft 16.

Motor seal 30, separated from pump seal 28 by seal leakage or collection chamber 32, comprises rotatable seal ring 96 and stationary seal ring 98, seal ring 98 encircling shaft 16 and being supported by housing part 100. Rings 96 and 98 have opposed seal faces 102 and 104, respectively, with ring 96 being urged toward ring 98 by coil springs 106 (only one of which is shown). Coil springs 106 are each received in a pocket 108 in spring holder 110 having an axially extending cylindrical portion 112 overlying at least a portion of ring 96. Ring 96 is keyed to portion 112 by key 114 received in opposed keyways in ring 96 and portion 112. Spring holder 110 is supported to rotate with shaft 16.

The ejector 34, (see especially FIGS. 3 and 6) comprises nozzle or jet 36, suction chamber 38, and Venturi restricted passage 116. Pumped liquid under pump pressure flows to ejector nozzle 36 thorough passage 118 and is discharged, along with entrained liquid from collection chamber 32, to the suction of the pump through passage 120. Pump seal 28 is vented by passage 122 to passage 120.

Figure 7:
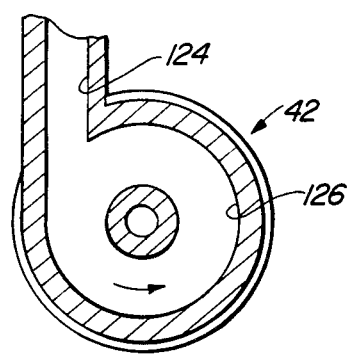
FIG. 7 is a cross-sectional view taken on line 7—7 of FIG. 6.

The liquid driving the ejector, which flows through passage 118, passes first through cyclone separator 42, illustrated in FIGS. 6 to 9. As shown best in FIG. 8, pumped liquid under pump discharge pressure flows from adjacent the impeller tip through passages 124 made up of interconnecting passage sections 124a, 124b and 124c, tangentially to conical inside surface 126 of separator 42 such that the liquid swirls, as indicated in FIG. 7. Solids, such as sand, which are heavier than the pumped liquid, will fall to the bottom of separator 42 to be carried by pumped liquid through passage 128 (FIG. 9) made up of interconnecting passage sections 128a, 128b and 128c back to a lower (than discharge) pressure region in pump casing 20. Pumped liquid, free of solids, flows upwardly through restricted opening 130 (FIG. 8) into passage 118, and from there to ejector nozzle 36. In some situations, where the liquid being pumped is substantially free of solids, the cyclone separator need not be used. In this case, pumped liquid is fed directly into ejector nozzle 36. Conventional liquid filters or separators may be substituted for the cyclone separator without departing from the spirit of the invention.

Figure 10:
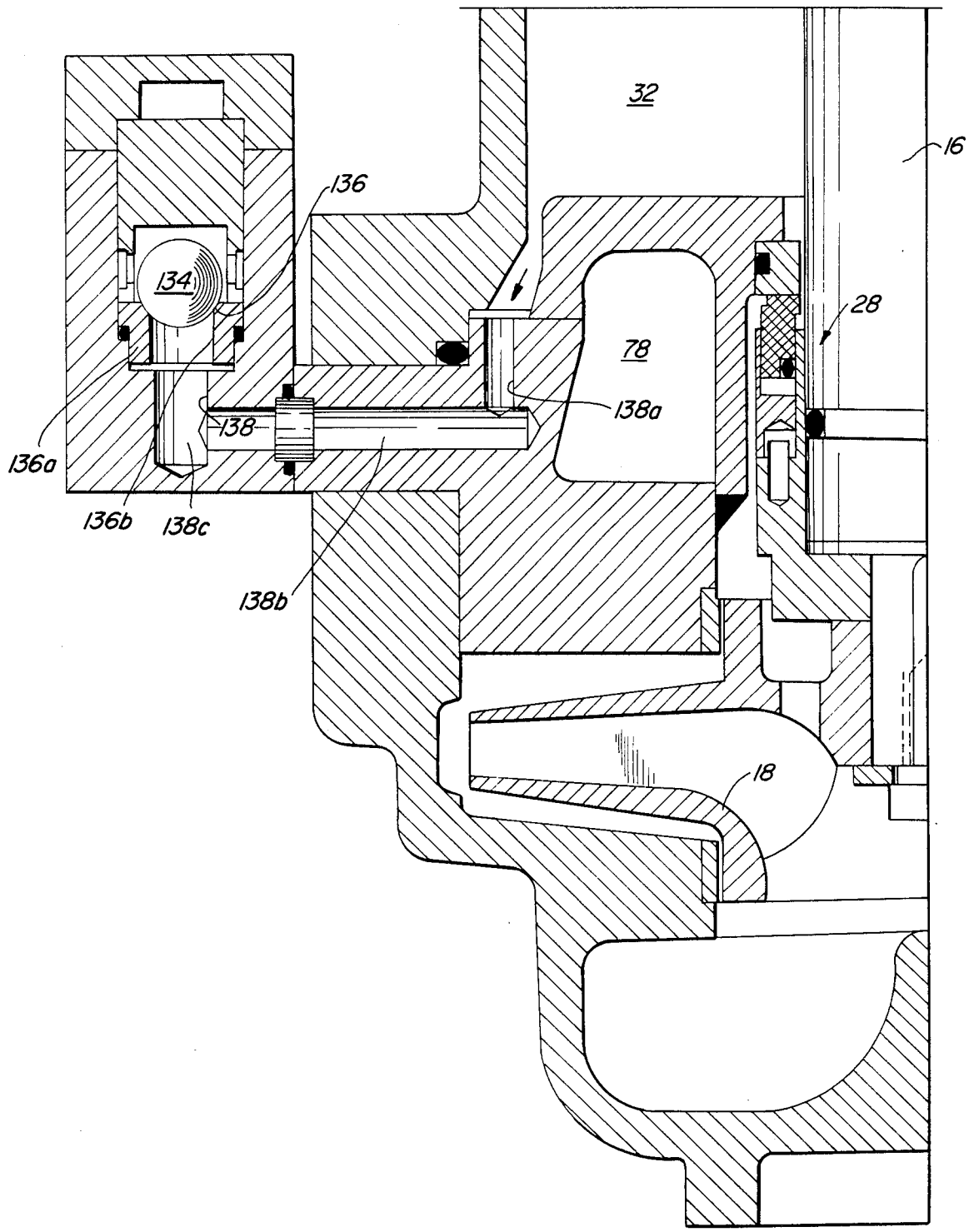
FIG. 10 is a cross-sectional view taken on line 10—10 of FIG. 6 through the one-way valve.

As shown in FIG. 10, pumped liquid which flows into seal leakage or collection chamber 32 past pump seal 28 is induced to flow by ejector 34 through a passage 138, made up of interconnecting sections 138a, 138b and 138c to the inlet side of one-way valve 40. The one-way valve 40, (FIG. 10) comprises ball 134 seating on seat 136 of member 136a having a bore 136b communicating with seal chamber 32 via passage sections 138c, 138b and 138a, forcing a high velocity stream of fluid into Venturi and passage 116 causes a low pressure zone in suction chamber 38 which induces flow through the one-eay valve 40, moving ball 134 off seat 136. Valve 40 effectively prevents the backflow of liquid to seal chamber 32. In the absence of suction of chamber 38, ball 134 seats on seat 136. Ejector 34, cyclone separator 42 and one-way check valve 40 are located in a block which is attached to pump housing 14. Other forms of check-valves can be used if desired.

I claim:
1. A pump assembly comprising:
a motor;
a housing for said motor;
a motor shaft extending from said motor and said housing;
a pump housing connected to said motor housing and having a pump inlet and a pump outlet;
an impeller arranged in said pump housing and connected to said shaft for pumping a liquid from said pump inlet to said pump outlet;
mechanical seal means surrounding said shaft and located between said pump housing and said motor housing to substantially prevent the ingress of pumped liquid into said motor housing, said mechanical seal means comprising a pair of mechanical seal assemblies each having a pair of seal rings with opposing seal faces and wherein one seal ring of each pair is rotatable relative to the other and means for resiliently urging one seal ring of each pair toward the other seal ring of said pair;
a seal leakage chamber surrounding said shaft and located between said seal assemblies and into which pumped liquid leaking across one of said pair of seal rings flows;
ejector means including a driving nozzle connected to said pump outlet such that said ejector means continuously operates as a function of pump operation; and
fluidic passageway connecting said ejector means to said seal leakage chamber and to said pump inlet in a manner whereby, upon pump operation, fluid from said seal leakage chamber is continuously evacuated to prevent the diffusion of liquid across said seal faces of the other of said seal assemblies and into said motor housing and is immediately returned to said pump inlet.

2. A pump assembly as recited in claim 1, further comprising a separator, said separator being so constructed and arranged to separate solids from said liquid which flows from the outlet to said ejector.

3. A pump assembly as recited in claim 1, further comprising a one-way valve between said seal chamber and said suction chamber to prevent the back-flow of liquid to said seal leakage chamber from said suction chamber.

4. A pump assembly as recited in claim 1, in which said one of said seal assemblies is closely adjacent to said impeller and said other of the seal assemblies is closely adjacent to said motor.

* * * * *